United States Patent [19]

Morey

[11] Patent Number: 4,484,183

[45] Date of Patent: Nov. 20, 1984

[54] METHOD AND SYSTEM FOR DETECTION OF THE PRESENCE, REMOVAL, OR ABSENCE OF A METAL BODY

[76] Inventor: Gilles M. Morey, 139 Rue de la Cascade, Crolle 38190 Brignoud, France

[21] Appl. No.: 313,076

[22] Filed: Oct. 19, 1981

[30] Foreign Application Priority Data

Oct. 20, 1980 [FR] France ............................ 80 22418

[51] Int. Cl.³ ............................................ G08B 13/26
[52] U.S. Cl. .................................. 340/568; 340/539; 340/545
[58] Field of Search .............. 340/539, 552, 562, 545, 340/568

[56] References Cited

U.S. PATENT DOCUMENTS

| | | | |
|---|---|---|---|
| 3,706,982 | 12/1971 | Gehman | 340/539 |
| 4,095,211 | 6/1978 | Shaughnessy | 340/539 |
| 4,101,872 | 7/1978 | Pappas | 340/539 |
| 4,257,038 | 3/1981 | Rounds et al. | 340/539 |

*Primary Examiner*—Glen R. Swann, III
*Attorney, Agent, or Firm*—Beveridge, De Grandi & Kline

[57] ABSTRACT

An oscillator circuit includes electromagnetic feedback which is interrupted by the presence of a metal body within the field of electromagnetic radiation. Thus, when the metal body is present, the circuit does not oscillate. Removal of the metal body causes the circuit to oscillate with a first characteristic, such as a first modulation period of off and on switching of the oscillator. Once the metal body has been absent for a preset time, the oscillation assumes a second characteristic, such as second modulation period of off and on switching. A receiver circuit monitors the oscillations, and a decoder determines which characteristic of the oscillation is present and provides a corresponding output indication. Among other uses, the system can be utilized as a security system to monitor the state of doors and windows.

21 Claims, 5 Drawing Figures

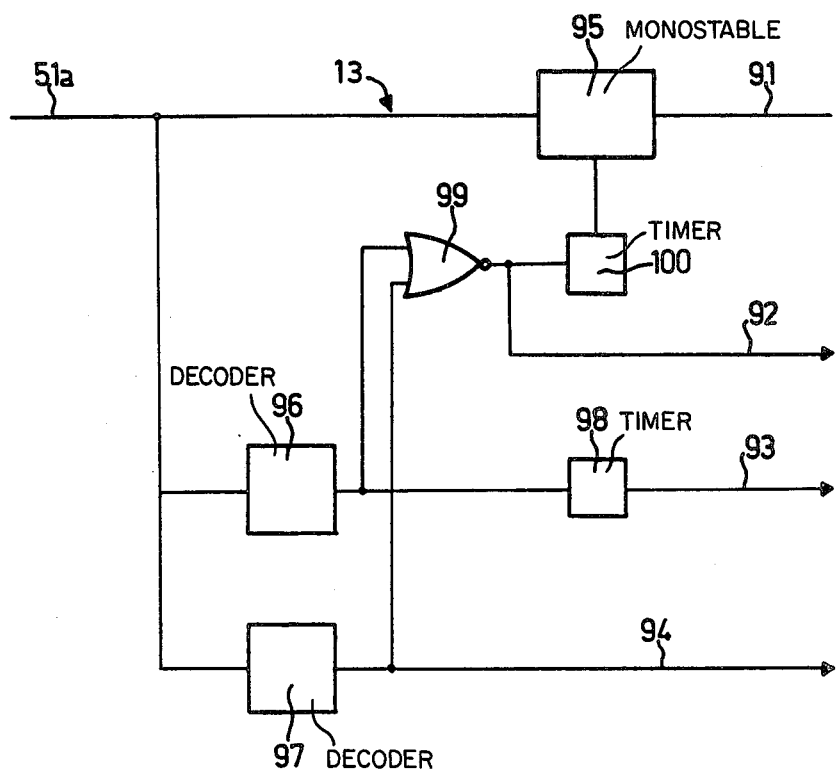

METHOD AND SYSTEM FOR DETECTION OF THE PRESENCE, REMOVAL, OR ABSENCE OF A METAL BODY

BACKGROUND OF INVENTION

The present invention relates to a method and a system for detecting the presence, the absence or the variation in position of a metal body, and in particular is applicable to surveillance installations or centralized automatic systems.

In the field of inductive static sensors, devices are known at the present time which are essentially designed to increase the reliability of detection by combining a separate transmitter and detector in which, for example, the transmitter is used as the object to be detected or in which the transmitter and the receiver are coupled by a passive transmission system or, again, in which the object to be detected comes and disturbs the electromagnetic coupling between the transmitter and the receiver. In each of these examples the inductive proximity sensor comprises two separate devices one of which carries out the transmission function and the other the detection furnction. In these examples the transmitter is either not modulated or modulated in a fixed manner independent of the electromagnetic condition of its surroundings. Furthermore, the data indicating the presence or absence of the object being detected depends on the amplitude of the signal received by the receiver-detector, with the permanent fixed modulation only being there to pick this out.

In addition surveillance installations or centralized automatic systems are known in which the data they require are sent by wired connections, either with loop or point-to-point structures. The wired connections connecting the various sections of these known conventional systems have the advantage of being simple, with known and reliable technology. However, the installation cost of these links is often much greater than the total cost of the equipment applied for detecting and processing the data, which finally makes wired systems very expensive. This high cost is a disadvantage in the field of protection against intrusions into low risk premises like offices, shops and private dwellings in which the overall cost of the installation is one of the basic factors.

SUMMARY OF THE INVENTION

The method and the device which are the object of the present invention are intended to remedy the shortcomings of the state of the art and enable substantial savings to be made in the final cost of the installed systems, whilst benefiting from the increased reliability due to the application of completely static devices.

The method of the present invention to detect the presence, absence or change in position of a body like a metal object, uses a sensor comprising an oscillator capacitor of generating or of radiating around it an electromagnetic field, and an operating device capable of supplying data on the position, or on the changes in position of the body, at its output.

The method according to the present invention is of a type in which the permanent modulation of the oscillations of the oscillator corresponding to a given position of the body is modified in reaction to the modification in the amplitude of these oscillations caused by a change in position of the body with respect to the oscillator. The operating device is sensitive to and capable of interpreting the modulation and/or modification of the modulation of the oscillations of the oscillator so as to supply the signals about the said body at its output.

The present invention therefore consists in making the oscillator modulation vary following a change in position of the body, or in accordance with the body's position with respect to the oscillator; this modulation may be amplitude, frequency or phase modulation or a combination of these. This variation in the modulation of the oscillator oscillations occurs as a result of or in accordance with the change in amplitude of the electromagnetic wave radiated by the oscillator, which change is due to the movement of the body with respect to this oscillator.

The operating device may be physically connected to the sensor, for example by wired connections. But, in a very interesting version of the method according to the present invention, the operating device is preferably placed at a distance from the sensor with a receiver comprised in this operating device being sensitized to the radio or electromagnetic signals emitted by the sensor's oscillator. Thus the method according to the invention enables only a single oscillator to be used which is capable of performing, firstly the required proximity detection, and secondly the transmission of radio or electromagnetic signals which can be processed at a distance by the operating device. It is thus possible to achieve substantial savings compared with conventional protection installations or centralized automatic systems, on the one hand by replacing the wired connections between the sensors and the operating unit by radio links and, on the other hand, by combining the detection and transmission functions in a single oscillator device. Furthermore, the data received and interpreted by the operating device depend, as indicated above, on the modulation of the signal coming from the sensor oscillator and not on its direct amplitude. This feature makes it possible both to protect against radio interference, which would be liable to detract from transmission reliability, and also to considerably increase the possible transmission distance, and this without having to control the amplitude of the oscillations of the sensor oscillator in accordance with the signal received by the receiver.

The method according to this invention is preferably so designed that, following a change in position of the body, the permanent modulation of the oscillator oscillations is temporarily changed. Thus the changes in position of the body with respect to the sensor oscillator generate transient or temporary modulation sequences the duration of which is therefore limited. These temporary modulations of the oscillator oscillations may, for example, correspond to "alarm" signals which will be interpreted appropriately by the operating device.

According to another version of the method according to the present invention, the permanent modulation of the oscillator oscillations is temporarily modified, with this temporary modification being conditioned by the type and/or duration of the permanent modulation preceding it. Thus a characteristic temporary or transient modulation can only be generated following a specific permanent modulation the duration of which was longer or shorter than a predetermined value. This ability to condition a temporary modulation by the duration of the permanent modulation preceding it makes it possible, for example, to prevent the transmission of inadvertent alarms in cases where, in an application like a perimeter protection installation, a door or a window is constantly flapping due to the action of draughts or mechanical vibrations.

According to this invention the operating device is, preferably, capable of simultaneously interpreting the temporary and the permanent modulations of the oscillations coming from oscillators of different sensors. This facility permits, notably in an application like a perimeter protection installation, the simultaneous surveillance of several sensors and also enables "alarm" signals to be taken into consideration after one or more openings have already been broken through.

The method according to the invention also has variants which enable the electrical energy consumption of the sensor and of the operating device to be limited so that the latter are independent and preferably supplied by low power batteries or cells which also have a very long life.

Modulation of the sensor oscillator oscillations may be of any kind. However, in order to limit the energy consumed the sensor oscillator is preferably made to operate so that its oscillations are amplitude modulated on the all-or-nothing principle with a very low cyclic ratio and, in order to also limit the electrical energy consumption of the operating device, it is made to operate sequentially in a "watch-or-off" mode according to a regular time cycle linked with the period of the transient and/or permanent modulations of the sensor oscillator.

The method according to the present invention also consists in preferably having the operating device operating on prolonged watch following the reception of a radio signal on its receiver; the duration of this prolonged watch phase can be conditioned by the significance of the received signal or by the need to analyse this signal in greater detail.

According to another version the prolonged watch phase of the operating device may be triggered by an outside command, and in a special application, the outside extended watch initiation order corresponds to a signal to start up the installation, so that the state of the sensors used in the installation is known from the start.

In order to avoid too frequent initiation of the prolonged watch mode of the operating device, and in order to save on the energy consumed by this device, a variant of the method according to this invention consists in totally blocking the sensor oscillator when the body to be detected is present close to the sensor oscillator or when it is absent.

Moreover, the method according to this invention is so designed that, preferably, the sensor oscillator oscillations are modulated in such a way as to distinguish it by a specific code which can be recognized by the operating device. Thus each sensor of a particular installation can be recognized by the operating device and the latter can, if it comprises a receiver connected to one or more sensors by radio, distinguish the signals emitted by the sensors it is in charge of from foreign signals coming, for example, from a neighbouring installation. In order to carry out this special coding the amplitude, the frequency or the phase of the oscillator oscillations can be modulated or a combination of these modulations used.

The method according to the invention therefore allows several distinct data to be supplied at the output of the operating device, and notably a permanent item of data corresponding to the presence of the body to be detected close to the sensor oscillator, with a permanent item of data corresponding to its absence and one or more temporary or transient data corresponding to the movements of the object to be detected close to the sensor oscillator. These temporary data may be interpreted as alarm signals, in particular. It can be pointed out that the ability to know the state of the sensor at all times, particularly following the outside permanent watch initiation command mentioned above, may be vary handy, for example, in installations for the perimeter surveillance of premises or when the sensor is used, for example, as a position detector in automated systems.

Another object of this invention is a system for detecting the presence or the absence or the change in position of a body like a metal object, notably for application of the method described above.

This system comprises a sensor made up notably of an oscillator capable of generating an electromagnetic field around it and a detector capable of detecting the amplitude of the oscillator oscillations, along with an operating device supplying data on the position and/or changes in position of the body at its output.

According to the present invention the sensor also comprises a modulator generating the modulation of the oscillator oscillations and capable of changing this modulation on command by the detector and the operating device comprises a receiver sensitive to the radio or electromagnetic signals transmitted by the sensor oscillator and means capable of interpreting the modulation of the received signals to generate the data concerning the position or position changes of the body.

According to the present invention the sensor modulator preferably comprises means enabling the modulation of the oscillator oscillations to be temporarily modified following a change in the position of the body.

The modulator can, in addition, comprise means capable of conditioning the temporary modification of the modulation of the oscillator oscillations according to the type and/or the duration of the permanent modulation preceding it.

In another version the sensor oscillator can be of the type with feedback through electromagnetic coupling and with quartz crystal stabilization. The presence of the body to be detected near to this oscillator blocks it by disturbing the magnetic coupling, for example between a tuned oscillating circuit and a feedback winding maintaining the oscillation. In this way the sensor detection sensitivity is relatively independent of the electrical parameters of the active element forming the oscillator, since this sensitivity essentially depends on the geometry of the oscillating circuit and the feedback winding. With this aim in view the said electromagnetic coupling feedback type oscillator can comprise two coaxial flat solenoids.

The sensor modulator may also comprise means generating signal to the oscillator such that the modulation of the oscillator oscillations is of the all-or-nothing pulsed type.

According to this invention the operating device may comprise, in addition to the receiver, a decoder capable of analysing the signals coming from the receiver and of generating on its output data concerning the position or change in position of the body and a sequencer capable of laying down watch off cycles for the receiver and/or decoder.

The operating device receiver can be of the superheterodyne type and comprise a local oscillator stage, a mixer stage capable of mixing the local oscillator oscillations and the signals received by the high-frequency stage and one or more intermediate-frequency amplifier stages, these stages being mounted electrically in series between the terminals of the electrical power supply and having the same mean current flowing through them; a detector can be combined with the last intermediate-frequency amplifier stage.

The sensor and the operating device of the detection system each comprise, preferably, a source of electrical energy consisting of a cell or battery so that the sensor and the operating device are self-contained and therefore independent of any outside source of electrical energy like the mains.

This invention also relates to a special detection system capable, notably, of being applied to installations for protecting the perimeter of premises in which an alarm must be set off, for example, when a door or window opens. In this case the body to be detected is a metal object preferably fixed onto the moving part of the closure means of the opening being watched, whilst the sensor is preferably fixed to the casing part, so that the metal body is right next to the sensor when the closure means is actually closed and is away from the sensor when this means is open.

According to this special detection system the sensor comprises an oscillator of the type with feedback by electromagnetic coupling and with quartz crystal stabilization and formed by two coaxial flat solenoids, a modulator of the multivibrator type with two transistors being blocked and unblocked simultaneously, the period and the cyclic ratio of the all-or-nothing output pulses of which are determined by the charging and discharging times of a capacitor, a capacitor delay circuit capable of modifying the period by acting on the charging and/or discharging time of the modulator's capacitor, a diode detector detecting the amplitude of the oscillator oscillations and acting on the timing or time delay circuit and a self-contained electrical power source like a single cell or battery element.

This sensor formed like this is so designed that when the body is in the immediate vicinity of the oscillator the latter is blocked or does not oscillate; when the body leaves the immediate vicinity of the oscillator the modulation of the oscillator oscillations imposed by the modulator corresponds to the modulator's natural rhythm for a time limited by the time delay circuit, with this rhythm corresponding to the transmission of the temporary alarm signal. When the body is not in the immediate vicinity of the sensor oscillator the rhythm of the oscillator oscillations corresponds to the rhythm of the modulator modified by the time delay circuit. It may be noted that, after the time set by the time delay circuit has passed the timing circuit modifies the modulator's natural rhythm so as to impose on it a special permanent rhythm corresponding to the signal "absence of body to be detected". Thus the modulator generates constant-width pulses with only two different periods, one corresponding the modulator's natural rhythm which occurs firstly when the body is present and the oscillator blocked and secondly during the temporary transmission of the alarm signal when the body has just moved away and unblocks the oscillator, and the other corresponding to the modulator's modified rhythm which occurs permanently when the body to be detected is absent.

The present invention also proposes a special operating device which can advantageously be combined with the special sensor described above. This operating device comprises a self-contained source of electrical energy like a cell or a battery, a receiver of radio or electromagnetic signals generating signals corresponding to the modulation of the high-frequency wave, a decoder of the received signals capable of supplying data on its output concerning the position or change in position of the said body and a sequencer.

In this example the receiver is of the superheterodyne type and comprises a local oscillator stage, a mixer stage connected to the local oscillator stage and to a high-frequency stage, one or more intermediate-frequency amplifier stages and a detector or a detection stage, with these various stages being of the transistor type and mounted electrically in series between the terminals of the electric power supply source so that the mean current biasing the stages is the same for each stage and the mean collector current flowing through the stages is the same for each stage. The receiver is preferably so designed that the signal supplied by the latter to the decoder corresponds to the modulation of the signal received by the receiver and the sequencer is preferably so designed that it successively connects and cuts off the electric power supply of the receiver and of the decoder at a watch-off rhythm that is compatible with the rhythm of the sensor oscillator oscillations.

In this variant the decoder may be capable of imposing a prolonged watch on the sequencer when it receives a signal coming from the receiver. In addition the sequencer may comprise an input for an outside command ordering it to make a prolonged watch.

BRIEF DESCRIPTION OF THE DRAWINGS

The detection method and system according to this invention will be more clearly understood on studying the non-limiting examples shown in the appended drawings in which:

And FIGS. 3, 4, and 5 show a special detection system described as a non-limiting example, with FIG. 3 showing a sensor, FIG. 4 showing an operating device and FIG. 5 showing part of the operating device in FIG. 4.

DETAILED DESCRIPTION OF THE INVENTION

Figure 1:
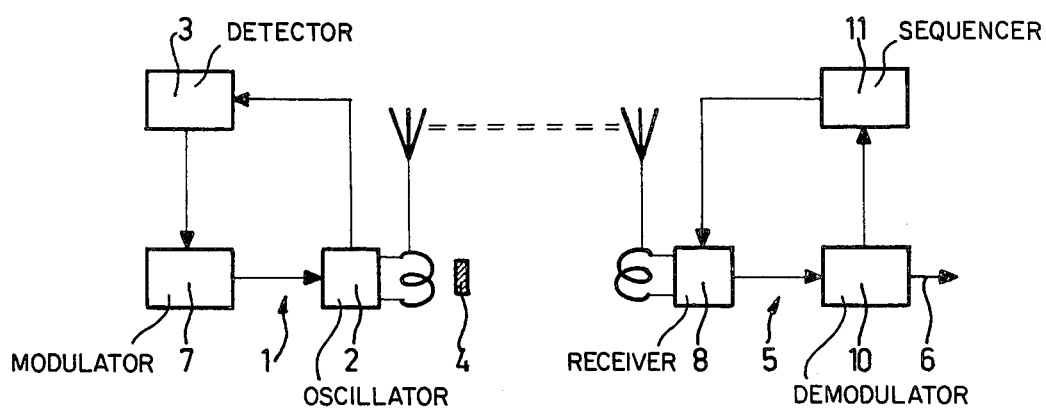
FIG. 1 schematically shows a simplified detection system.

The detection system shown in FIG. 1 includes a sensor 1 comprising an oscillator 2 capable of generating an electromagnetic field in its vicinity and a detector 3 capable of detecting the amplitude of the oscillator oscillations determined by the position of the body 4 with respect to the oscillator. The detection system further includes an operating device 5, supplying signals on its output 6 concerning the position and/or changes in position of the body 4 with respect to the oscillator 2.

The sensor 1 further comprises a modulator 7 generating the modulation of the oscillator oscillations and capable of modifying this modulation in accordance with the signals coming from the detector 3 or on a command coming from this detector.

Figure 2:
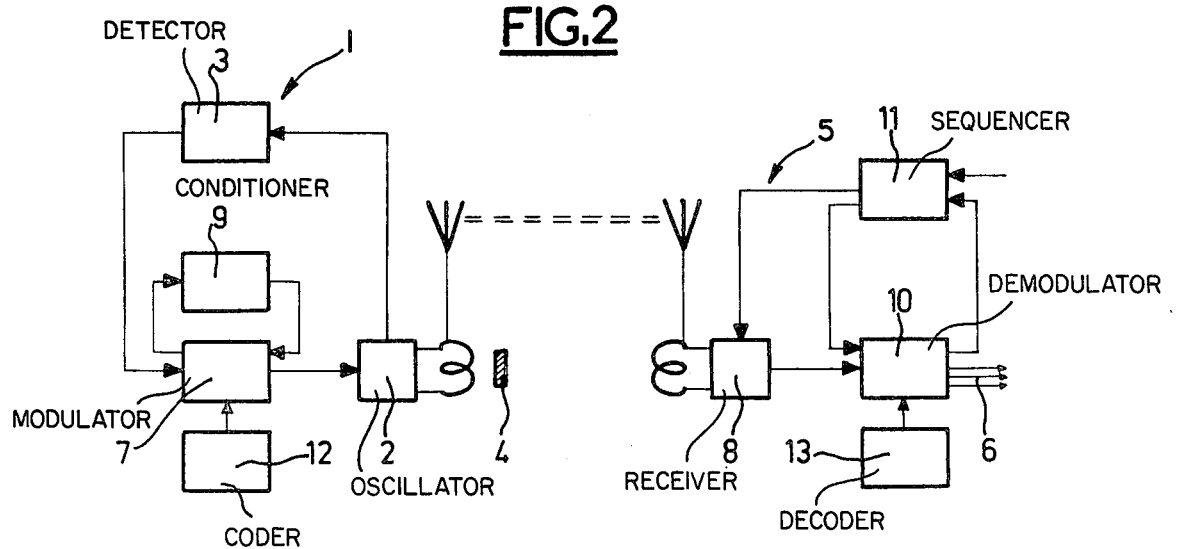
FIG. 2 shows the detection system according to FIG. 1 with additions.

The operating device 5 comprises a receiver 8 that is sensitive to radio or electromagnetic signals, arbitrarily shown in FIGS. 1 and 2 by a double broken line, transmitted by the oscillator 2 of the sensor 1. This device 5 also comprises a demodulation 10 capable of analysing the signals coming from the receiver 8 and of generating data on its output 6 that concern the position or change in position of the body 4, and a sequencer 11 capable of imposing watch-off cycles on the receiver 8.

In the embodiment illustrated in FIG. 2, the sensor 1 also comprises means 9 capable of delaying and/or conditioning the generation of temporary modulations according to the type and/or the duration of the permanent modulation preceding them.

The sensor 1 also comprises means 12 of coding the oscillations of the oscillator 2, and the operating device 5 comprises means 13 capable of interpreting this coding.

Figure 3:
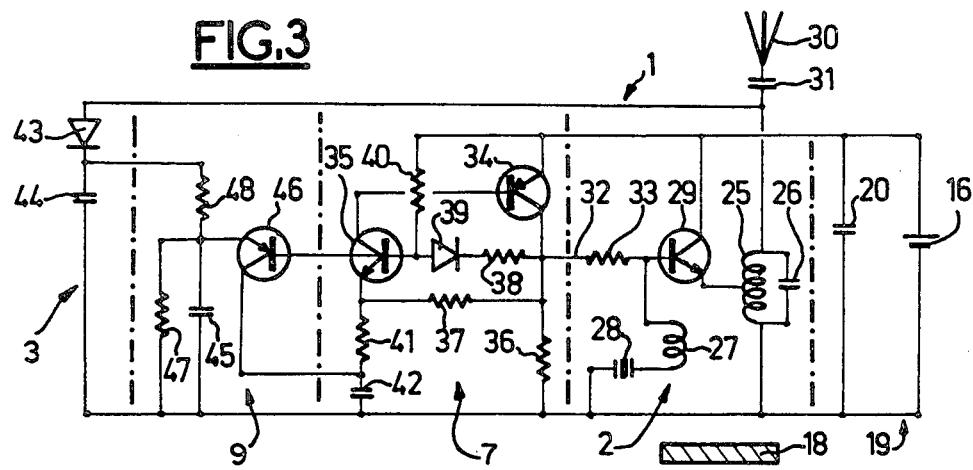
Figure 4:
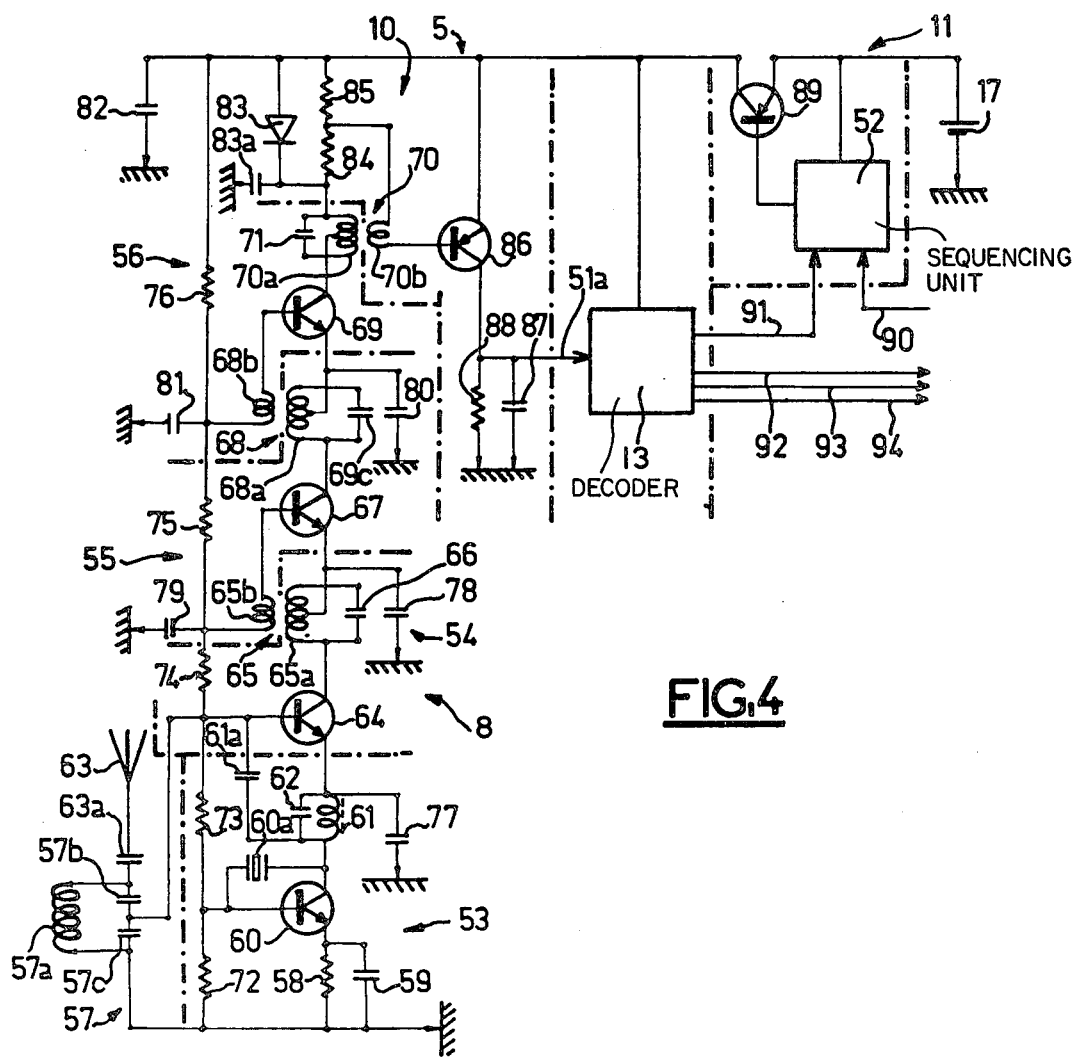

Referring to FIGS. 3, 4 and 5 we shall now describe this special detection system.

This special detection system comprises a sensor 1 shown in FIG. 3 and an operating device 5 shown in FIGS. 4 and 5. The sensor 1 and the operating device 5 are completely separate, the operating device 5 being some distance away from the sensor 1 and connected to it only electromagnetically or by radio.

The sensor 1 and the operating device 5 have been specially designed to be respectively independent and of long endurance so as to be able to be fed respectively by batteries 16 and 17. Their structure and operating mode therefore allow low consumption of electrical energy.

The detection system shown in FIGS. 3, 4 and 5 is particularly suitable for a perimeter protection installation watching openings like doors or windows; the operating device 5 is capable of managing the data received from several sensors identical or similar to sensor 1. In this case relating to a closure means, it is useful to know whether this means is closed, open or if it has just been opened.

In a special arrangement the sensor 1 is connected to the frame of the closure means and a metal body 4 is fixed to the flap or leaf of this closure means and can come very close to the sensor 1 when this closure means is closed and move a considerable distance away when this latter is open. A reverse arrangement is also possible. The operating device 5 can be installed in a position distant from the sensor 1 and be linked to an alarm device.

The sensor 1 comprises an energy source 19 formed by the battery 16 which is decoupled by a capacitor 20, an oscillator 2 capable of generating an electromagnetic field, a modulator 7 generating the modulation of the oscillator 2 oscillations, a timing device 9 and a detector 3. The source of electrical energy 19, the oscillator 2, the modulator 7, the timing device 9 and the detector 3 are roughly outlined in FIG. 3 by thick chain-dotted lines.

The tuned oscillator 2 is of the type with feedback by magnetic coupling and comprises an inductor 25, across the ends of which a tuning capacitor 26 is mounted in parallel, a solenoid or reactance coil 27 in series with a frequency stabilizing quartz crystal 28, with this solenoid and this crystal being mounted between the negative terminal of the battery 16 and the base of a transistor 29, the emitter of which is connected to an intermediate connection on the inductor 25 and the collector of which is connected to the positive terminal of the battery 16. One of the end terminals of the inductor 25 is connected to the negative terminal of the battery 16 whilst its other end terminal is connected to an antenna 30 via a capacitor 31. The inductor 25 and the reactance coil 27 may advantageously take the form of two coaxial flat solenoids printed onto the circuit supporting the sensor components.

Modulation of the oscillator 2 is performed by applying the pulses coming from modulator 7 to the base of transistor 29 through the oscillator input 32 via resistor 33.

In the proposed embodiment, the oscillator described above is especially advantageous. Thus, when the metal body 4 is close to the inductor 25 and to the reactance coil or reactor 27, the electromagnetic coupling between the inductor 25 and the reactor 27 is disturbed, so that the oscillator 2 no longer oscillates and therefore does not transmit any radio or electromagnetic waves.

The modulator 7 is of the multivibrator type and is designed to modulate the oscillator 2 oscillations on an all-or-nothing basis according to a low cyclic ratio. The modulator 7 comprises a transistor 34 and a transistor 35 which are blocked and unblocked at the same time. The collector of transistor 34 which is connected to input 32 of oscillator 2 is also connected to the negative terminal of the battery 16 via a resistor 36, to the emitter of transistor 35 via a resistor 37 and to the base of transistor 35 via a resistor 38 and a diode 39 which is used to stabilize the period of the modulator with respect to the fluctuations in the power supply and the ambient temperature conditions. The emitter of transistor 34 is connected to the positive terminal of battery 16 and is also connected to the base of transistor 35 via a resistor 40. In addition, the emitter of transistor 35 is connected to the negative terminal of the power supply via a resistor 41 and a capacitor 42, and the collector of transistor 35 is connected directly to the base of transistor 34.

The modulator 7 enables oscillations of all-or-nothing pulsed type to be generated on the input line 32 of oscillator 2 thanks to capacitor 42. Thus, if the components are well chosen, the charging time of capacitor 42 through resistor 41 determines the time during which the oscillator 2 operates, if it is not blocked by the body 4, and the discharge time of this capacitor 42 through resistors 41 and 37 determines the rest time of oscillator 2. This pulsed rhythm is the natural rhythm of the modulator 7.

The detector 24 comprises a diode 43 and a capacitor 44 mounted in series between the end terminal of the inductor 25 connected to the antenna 30 and the negative terminal of the power supply 16. The diode 43 and the capacitor 44 enable the high-frequency voltage generated by oscillator 2 to be detected.

The timing device 9 enables the natural rhythm of the modulator 7 to be modified. The timing device 9 comprises a capacitor 45 which enables the discharge time of capacitor 42 corresponding to the stoppage of oscillator 2 to be extended. In order to achieve this result the timing device 9 comprises a transistor 46 the base of which is connected to the base of transistor 35 of modulator 7, the collector of which is connected to modulator 7 between resistor 41 and capacitor 42 and the emitter of which is connected to the negative terminal of the power supply 16 via a resistor 47 mounted in parallel with capacitor 45 and is also connected to the common point between diode 43 and capacitor 44 of the detector 24 via a resistor 48.

The sensor 1 which has just been described operates in the following way. When the body 4 is close to the oscillator 2 this oscillator is blocked. Consequently no radio or electromagnetic signal is transmitted by this latter. When the body 14 moves away from the immediate vicinity of the oscillator 2 the modulator 7 imposes its own rhythm on the oscillator 2. At the same time the capacitor 45 is slowly charged up by the rectified pulsed high-frequency voltage. When the voltage on capacitor 45 is suficiently high a part of the charge that has built up on it during each pulse of the modulator 7 is transferred to capacitor 42 during the stopping of the oscillator 2 by transistor 46 which has become conducting. A new rhythm of pulsations of modulator 7 is then set up. This new rhythm corresponds to the fact that the body 4 is absent.

The sensor 1 therefore enables the oscillations of the oscillator 2 to be modulated according to two rhythms so as to emit two radio signals modulated differently, with a first rhythm corresponding to the fact that the body 4 has just moved away from the oscillator 2 and corresponding to an alarm signal and a second rhythm corresponding to the fact that the object 4 is absent from the immediate vicinity of the oscillator 2 for a time exceeding the time predetermined by the timing circuit 9.

Furthermore, this sensor is designed so as not to transmit a signal corresponding to the alarm when the body 4 moves away from and returns to the immediate vicinity of the oscillator 2 following flapping of the closure means carrying the body 4. Thus, when the body 4 returns to block the oscillator 2, capacitor 45, which is no longer recharged, discharges slowly through resistor 47. For the sensor to retransmit an alarm signal which is of sufficient duration to be taken into consideration by the associated operating device, it is necessary for capacitor 45 to have discharged sufficiently. This determines a minimum time after the return of the body 4 up to which it is impossible to transmit a signal corresponding to a valid alarm.

Referring to FIGS. 4 and 5 we are now going to describe the operating device 5, the different sections and sub-sections of which are roughly separated by heavy chain-dotted lines.

The operating device 5 comprises a receiver-detector section consisting of receiver 8, detector 10, decoder 13, sequencer 11 which includes a sequencing unit, 52 and electrical power supply source 17.

The receiver 8 is designed, in combination with the detector 10, so as to consume little electrical energy.

The receiver 8 is of the superheterodyne type and comprises in succession a local oscillator stage 53, a mixer stage 54, two intermediate-frequency amplifier stages 55 and 56 along with a high-frequency stage 57 connected to the mixer stage 54. These various stages are very well known per se. However, in the example shown these stages are assembled in a special way so as to make the receiver a low electrical energy consumer. Thus, the various stages making up the receiver 8 are connected electrically in series between the power supply terminals so that the mean current biasing the stages is the same for each stage and the mean collector current flowing through the stages is the same for each stage.

For this purpose the following were mounted in series between the negative terminal and the positive terminal of the power supply 17: a resistor 58 with a capacitor 59 in parallel, a transistor 60, and a solenoid 61 with a capacitor 62 in parallel for the local oscillator stage 53, a transistor 64 and the primary 65a of a transformer 65 with a capacitor 66 in parallel for the mixer stage 54, a transistor 67 and the primary 68a of of a transformer 68 with a capacitor 69c in parallel for the intermediate-frequency amplifier stage 55, and a transistor 69 and the primary 70a of a transformer 70 with a capacitor 71 in parallel for the intermediate-frequency amplifier stage 56. Between the electric power supply terminals are also mounted in series biasing resistors 72, 73, 74, 75 and 76, with the base of transistor 60 being connected to the junction between resistors 72 and 73, the base of transistor 64 being connected to the junction between resistors 73 and 74, the base of transistor 67 being connected to the junction between resistors 74 and 75 via the secondary 65b of transformer 65 and the base of transistor 69 being connected to the junction between resistors 75 and 76 through the secondary 68b of transformer 68. The various stages are decoupled by capacitors 77, 78, 79, 80, 81 and 82. In addition a quartz crystal 60a is mounted between the base and the collector of transistor 60, and a capacitor 61a is mounted between the collector of transistor 60 and the base transistor 64.

The high-frequency stage 57 comprises a winding 57a the two ends of which are connected to the base of transistor 64 of the mixer stage 54 through capacitances 57b and 57c, respectively, with one of the ends of winding 57a being also connected to the negative terminal of the power supply 17 and the other of its end being connected to an antenna 63 via a capacitor 63a.

The detector 10 comprises a biasing diode 83 and, mounted in parallel with this diode 83, a voltage divider formed by the series resistors 84 and 85. The diode 83 and resistors 84 and 85 are also mounted in series with stages 53, 54, 55 and 56 on the side of the amplifier stage 56, with the junction between this stage 56 and diode 83 being decoupled by capacitor 83a.

The junction between resistors 84 and 85 is connected to the base of a detection transistor 86 through the secondary 70b of transformer 70. The emitter of transistor 86 is connected to the positive terminal of the power supply, and its collector is connected to the input 51a of the decoder 13, this collector being further connected to the negative terminal of the power supply via a capacitor 87 and a resistor 88 connected in parallel. Transistor 86, used for amplitude detection, is biased to the conducting limit by diode 83 and by resistors 84 and 85. It therefore does not conduct in the absence of high-frequency signals.

The decoder 13 and the sequencing unit 52 do not have any special electrical characteristics. However, in order to limit the electrical power consumption of the operating device 5, the sequencing unit 52 has a known structure designed so that it regulates, in accordance with a watch-off cycle, the operation of the receiver 8, the detector 10 and the decoder 13 by cutting off and reconnecting their power supply sequentially through the switching of transistor 89 mounted in series with the positive line, with the sequencer itself being supplied permanently.

In addition the sequencing unit 52 has an input 90 which permits the receiver-detector to be put on prolonged watch by an outside command, and the decoder 13 is connected to the sequencing unit 52 by line 91, notably in order to impose a prolonged watch on sequencer 11 on reception of a radio signal and so that the decoder 13 has the time to analyse the signal received on its input 51a. In order to achieve this prolonged watch the sequenching unit 52 maintains transistor 89 conducting so that it then feeds the receiver 8, the detector 10 and the decoder 13 permanently during the prolonged watch phase.

With reference to FIG. 5 a decoder 13 will be described which is particularly well adapted to the example described.

The input line 51a to the decoder 13, connected to the collector of transistor 86, is connected to the input of a monostable 95, to the input of a decoder 96 of the "alarm" type modulation, and to the input of a decoder 97 of the "absence" type modulation, with these modulations corresponding respectively to the natural modulation and to the modified modulation of the modulator 7 of the sensor 1.

The output of the monostable 95 is connected by line 91 to the sequencer 52 and this monostable is capable of imposing a prolonged watch on the sequencer 52 of limited duration, but it can be unset at any time as will be seen later.

The output of decoder 97 is connected to output line 94 of decoder 13. Decoder 96 is connected to output line 93 of decoder 13 via a timing circuit 98.

Decoders 96 and 97 are responsible for recognizing the temporary all-or-nothing modulation of the signals received by the receiver 8, i.e. if, and only if, this time modulation has a period and a cyclic ratio corresponding to the temporary "alarm" signal, decoder 96 will give a "1" logic signal on its output so long as the temporary "alarm" signal is present at its input. If the temporary all-or-nothing modulation present on input 51a of decoder 13 corresponds to the "object absent" information, then that decoder 97 that will post a "1" logic signal to its output 94 so long as the permanent modulation corresponding to the absence of the object to be detected is present at input 51a. If the modulation present at input 51a of the decoder corresponds neither to the "alarm" signal nor to the "object absent" signal, the respective outputs of modulation decoders 96 and 97 will give a logic "0" corresponding to an absence of electrical voltage.

Decoders 96 and 97 are each connected to one input of a NOR gate 99 the output of which is connected to output 92 of decoder 13 and to the input of a timing circuit 100. The output of this timing circuit 100 is connected to the monostable 95 in such a manner as to reset this latter as will be seen.

In the example shown, output 93 from decoder 13 supplies an "alarm" type item of information, output 94 supplies an "absence of object" type of information, and output 92 supplies a "presence of object" type of information.

We shall now describe how the operating device 5 shown in FIGS. 4 and 5 works in relation with the sensor 1 shown in FIG. 3.

The receiver 8, the detector 10 and the decoder 13 operate on a watch-off type surveillance rhythm imposed by the sequencer 11 which feeds them sequentially.

If the high-frequency stage 57 receives no signal transistor 86 remains blocked and no signal appears on input 51a of the decoder 51. Decoder 51 then supplies an item of data on its output 92 indicating that the oscillator 2 is blocked and, therefore, the body 4 is near the oscillator 2 of the sensor 1 and that the closure means is closed.

It an electromagnetic or radio wave is picked up by the high-frequency stage 57, the detector 50 detects this wave and a voltage appears at input 51a of the decoder 13 via transistor 86. Thanks to its monostable 95 which is set, the decoder 13 imposes a prolonged watch on sequencer 11 via line 91 lasting long enough to allow it to interpret the signal received.

If the signal received comes from the sensor 1 the decoder 13 supplies a signal on one of its outputs 93 or 94 corresponding to the body 4 having recently moved away or to the body being absent.

If the signal received by the operating device is a signal corresponding to the natural rhythm of the modulator 22 within sensor 1, it is decoded by decoder 96. And if this signal has a minimum duration equal to the time delay imposed by the timing circuit 98, decode 13 supplies an item of data on its output 93 enabling an alarm associated with this output to be set off. If the received signal corresponds to the modified rhythm the sensor 1, corresponding to the fact that the object 4 is absent, it is decoded by decoder 97, and decoder 13 supplies an item of data on its output 94 corresponding to the fact that the closure means is open.

On the other hand, if the received signal does not originate with the sensor 1, the timing circuit 100, after a preset time, unsets the monostable 95 and the sequencer 52 repeats its watch-off cycle.

A protection system comprising the detector 1 according to FIG. 3 and the operating device 5 according to FIGS. 4 and 5 has been implemented. In this implemented embodiment the oscillator 2 of the sensor 1 transmits, for three seconds, an electromagnetic wave or radio wave representing a duration of 3 milliseconds and a period of 100 milliseconds when the body 4 has just left the vicinity of the oscillator 2, i.e. when the opening means associated with the body 4 has just opened. The oscillator 2 then transmits a 5-second wave corresponding to the fact that the body 4 has been absent for a certain time from the immediate vicinity of the oscillator 2 and therefore the fact that the closure means is open. This wave follows the first one and permits the transmission of an "alarm" signal coming from another sensor between two pulses.

The implemented operating device 5 is so designed that the sequencer 11 imposes a watch rhythm of 120 milliseconds every 500 milliseconds. The prolonged watch imposed by monostable 95 of decoder 13 on sequencer 11, following reception of a signal, lasts for 3 seconds. If the signal received by the operating device 5 does not come from the sensor 1, the timing circuit 100 of detector 13 resets the monostable 95 after 150 milliseconds. The minimum duration of the presence of the alarm signal at the input to the detector 13 for this signal to be validated is 500 milliseconds; this duration is determined by the timing circuit 98 of the detector 13.

The present invention is not limited to the example described above referring to the appended figures. The system and method according to this invention can be applied in various ways, particularly by applying sophisticated coding and modulation methods. The device which is the object of the present invention may also be improved by integrating thick film and, above all, thin film technology electronics so as to reduce costs and the volumes taken up, notably when applications are involved which concern perimeter protection systems. In addition, the decoding and sequencing functions applied in the operating device can advantageously use the enormous possibilities of microprocessors. The present invention therefore makes possible the implementation of completely self-contained detection systems of low cost which can be applied notably to the centralization of data on movable elements located in premises so as to manage the protection and automatic systems installed in these premises.

I claim:

1. A method of detecting the presence, removal of absence of a metal body within an area comprising:

altering a magnetic field within the area between a first condition and a second condition in accordance with the presence or absence of a metal body within the area;

coupling the magnetic field to an oscillator circuit to inhibit oscillation of said oscillator circuit in response to the first magnetic field condition and to enable oscillation of said oscillator circuit in response to the second magnetic field condition;

generating a first output signal in response to absence of oscillation of said oscillator circuit to indicate presence of the metal body within the area, a second output signal in response to oscillation of said oscillator circuit for less than a first preset time to indicate removal of the metal body from the area, and a third output signal in response to oscillation of said oscillator circuit for more than the first preset time to indicate absence of the metal body from the area.

2. A method as claimed in claim 1 further comprising continuing to inhibit oscillation of said oscillator circuit for a second preset time following initiation of the second magnetic field condition to continue generation of the first output signal and to inhibit generation of the second and third output signals upon brief intermittent absence of the metal body from the area for intervals less than the second preset time.

3. A method as claimed in claim 1 further comprising altering a characteristic of the oscillation of said oscillator circuit in response to oscillation thereof for at least the first preset time, and in which the second output signal is generated in response to oscillation of said oscillator circuit prior to alteration of the characteristic and the third output signal is generated in response to oscillation of said oscillator circuit following alteration of the characteristic.

4. A method as claimed in claim 3 in which the characteristic of the oscillation of the oscillator circuit that is altered is the on-off cycle of the oscillator circuit, with the on-off cycle having a first on-to-off ratio during the first characteristic and a second on-to-off ratio during the second characteristic.

5. A method as claimed in claim 3 further comprising transmitting a radio signal indicative of the oscillation of said oscillator circuit; receiving the radio signal with a radio receiver; and generating one of the output signals in accordance with the absence or presence of and the characteristic of the oscillator signal as indicated in the received radio signal.

6. A method as claimed in claim 5 in which the characteristic of the oscillation of the oscillator circuit that is altered is the on-off cycle of the oscillator circuit, with the on-off cycle having a first on-to-off ratio during the first characteristic and a second on-to-off ratio during the second characteristic.

7. A method as claimed in claim 6 in which said radio receiver has an on-off cycle corresponding to the on-off cycle of one of the characteristics of the oscillator circuit.

8. A method as claimed in claim 7 in which the radio receiver is retained on for a third preset time following receipt of the radio signal.

9. A method as claimed in claim 1 further comprising modulating the oscillation of said oscillator circuit in a manner to distinguish the oscillator circuit from other oscillator circuits.

10. A system for detecting the presence, removal, or absence of a metal body within an area comprising:

(a) a sensor including:
an oscillator circuit having electromagnetic control means generating a magnetic field within the area and responsive to the presence of a metal body within the area for inhibiting oscillation of said oscillator circuit and to the absence of the metal body within the area for enabling oscillation of said oscillator circuit;
a modulator circuit for modulating the oscillation of said oscillator circuit; and
a detector circuit including timing means and responsive to detection of oscillation by said oscillator circuit for at least a first preset time for adjusting said modulator circuit to change the manner of modulation of the oscillation of said oscillator circuit, causing said oscillator circuit, upon removal of the metal body from the area, to oscillate with a first characteristic for the first preset time and, upon continued absence of the metal body from the area, to oscillate with a second characteristic; and (b) a receiver for sensing the oscillation of said oscillator circuit and including means for generating a first output signal in the absence of oscillation by said oscillator circuit to indicate presence of the metal body within the area, a second output signal in the presence of oscillation by said oscillator circuit with the first characteristic to indicate removal of the metal body from the area, and a third output signal in the presence of oscillation by said oscillator circuit with the second characteristic to indicate absence of the metal body from the area.

11. A system as claimed in claim 10 further comprising means for continuing to inhibit oscillation of said oscillator circuit for a second preset time upon absence of the metal body from the area to cause continued generation of the first output signal and inhibition of the second and third output signals upon brief intermittent absence of the metal body from the area for intervals shorter than the second preset time.

12. A system as claimed in claim 10 in which said electromagnetic control means comprises magnetic feedback coupling.

13. A system as claimed in claim 12 in which said oscillator circuit includes a crystal for controlling the oscillator frequency.

14. A system as claimed in claim 12 in which said magnetic feedback coupling comprises a pair of flat solenoid windings.

15. A system as claimed in claim 10 in which said modulator circuit includes means for modulating the oscillations of said oscillator circuit by switching said oscillator circuit off and on in a predetermined pattern.

16. A system as claimed in claim 15 in which said receiver includes a decoder for determining the manner of modulation of the oscillation of the oscillator circuit and for controlling the generation of the output signals in accordance with the determined manner of modulation.

17. A system as claimed in claim 16 in which said sensor further includes a radio transmitter for transmitting signals indicative of the oscillation of said oscillator circuit and in which said receiver further includes radio receiving means for receiving the transmitted signals and controlling the output signal generating means in accordance with the characteristics and duration of the oscillations from said oscillator circuit as indicated by the received signals.

18. A system as claimed in claim 17 in which said receiver further includes means for switching said radio receiving means off and on in the predetermined pattern.

19. A system as claimed in claim 18 in which said receiver further includes means for retaining said radio receiving means on for a third preset time following receipt of the transmitted signal.

20. A system as claimed in 10 in which said receiver includes a decoder for determining the manner of modulation of the oscillation of the oscillator circuit and for controlling the generation of the output signals in accordance with the determined manner of modulation.

21. A system as claimed in claim 10 in which said sensor further includes a radio transmitter for transmitting signals indicative of the oscillation of said oscillator circuit and in which said receiver further includes radio receiving means for receiving the transmitted signals and controlling the output signal generating means in accordance with the characteristics and duration of the oscillations from said oscillator circuit as indicated by the received signals.

* * * * *